(12) United States Patent
Livingston et al.

(10) Patent No.: US 7,896,616 B2
(45) Date of Patent: Mar. 1, 2011

(54) INTEGRATED LEADING EDGE FOR WIND TURBINE BLADE

(75) Inventors: Jamie T. Livingston, Simpsonville, SC (US); Nicolas K. Althoff, Ware Shoals, SC (US); Stefan Herr, Greenville, SC (US); Kevin J. Standish, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 790 days.

(21) Appl. No.: 11/699,531

(22) Filed: Jan. 29, 2007

(65) Prior Publication Data

US 2008/0181775 A1    Jul. 31, 2008

(51) Int. Cl.
*F03D 11/00* (2006.01)
(52) U.S. Cl. .................... 416/95; 416/146 R; 416/230; 416/224
(58) Field of Classification Search ............. 416/146 R, 416/229 R, 230, 224, 95; 290/44, 55
See application file for complete search history.

(56) References Cited

U.S. PATENT DOCUMENTS

| | | | | |
|---|---|---|---|---|
| 4,944,655 A * | 7/1990 | Merz | ................. | 416/61 |
| 5,863,181 A * | 1/1999 | Bost et al. | .............. | 416/224 |
| 6,457,943 B1 * | 10/2002 | Olsen et al. | ............. | 416/230 |
| 6,612,810 B1 * | 9/2003 | Olsen et al. | ............. | 416/95 |
| 6,890,152 B1 * | 5/2005 | Thisted | ............... | 416/1 |
| 7,217,091 B2 * | 5/2007 | LeMieux | ............... | 416/95 |
| 2004/0130842 A1 | 7/2004 | Johansen et al. | | |

* cited by examiner

*Primary Examiner*—Ninh H Nguyen
(74) *Attorney, Agent, or Firm*—Edward J. Smith; Ernest G. Cusick; Frank A. Landgraff (57) ABSTRACT

A wind turbine blade that includes integrated erosion, lightning and icing protection for a leading edge. The leading edge includes a frontal surface with an erosion shield positioned external to the frontal surface. An internal lightning conveyance path is provided with an electrical connection from the erosion shield to the internal lightning conveyance path. A heat-generating element is positioned between the erosion shield and the frontal surface and a heat conduction path is provided from the heat-generating element to the erosion shield. Further, a structure is provided for connecting the heat-generating element to an energy source within the blade.

27 Claims, 11 Drawing Sheets

INTEGRATED LEADING EDGE FOR WIND TURBINE BLADE

BACKGROUND OF THE INVENTION

The invention relates generally to protection of a wind turbine against multiple elements of nature and more specifically to an integrated system for protection of the leading edge of the wind turbine blade against erosion, lightning and icing.

Wind turbines are anticipated to becoming a progressively larger source of energy throughout the world, based on their capture of a renewable source of energy that does not emit carbon-based gases. However, the very essence of the power source is exposure to wind. With that exposure to the wind, the wind turbine and its blades are exposed to the natural elemental hazards, including erosion, lightning, and icing.

Wind turbine blades are aerodynamically designed to efficiently capture the wind and translate the wind energy into rotational motion of the blades, and ultimately to be transformed, through an electrical generator, into electrical power. Erosion of the leading edge of the blade will deform the aerodynamic shape leading to reduced efficiency of wind capture and lower power output. Wind and rain can result in blade erosion, but entrained sand, dirt and debris can lead to more serious wear and deformation.

Wind turbines are often erected in open or elevated locations, attracting lightning, because they are at the highest point. The blades of the turbine rotate to establish the highest point of the turbine structure, often becoming the strike point for the lightning. Similar to erosion, damage to the leading edge of the blade from lightning strikes will lead to lower efficiency and output. While the erosion tends to occur more broadly across the surface of the leading edge, lightning strikes tend to create more concentrated damage at the point of the strike, even to the point of destruction of the blade.

Blade icing impacts performance by changing the shape of the blade and impacting aerodynamic performance. Icing on the blade also creates a hazard for people and equipment beneath and in proximity to the wind turbine. The ice, when it breaks off the blade due to melting or mechanical forces, may be ejected at the rotational speed of the blade and drop from a significant height.

Various methods and systems have been provided for protecting wind turbines blades against the natural elements. However, these methods generally address protecting against only one type of damage to the blade or to the leading edge.

Accordingly, there is a need to provide an integrated system of erosion, lightning and icing protection for the leading edge of a wind turbine blade.

BRIEF DESCRIPTION OF THE INVENTION

The present invention relates to a system and method for protecting a leading edge of a wind turbine blade against erosion, lightning and icing.

Briefly in accordance with one aspect of the present invention, a wind turbine blade is provided that includes integrated protection for a leading edge. The leading edge includes a frontal surface with an erosion shield positioned external to the frontal surface. An internal lightning conveyance path is provided with an electrical connection from the erosion shield to the internal lightning conveyance path. A heating element is positioned in proximity to the erosion shield and the frontal surface. A heat conduction path is provided from the heat-generating element to the erosion shield. Further, means are provided for connecting the heating element to an energy source within the blade.

In accordance with a second aspect of the present invention, an integrated protection system is provided for a leading edge of a wind turbine blade. The protection system includes a wind turbine blade with a leading edge, the leading edge including a frontal surface, and protective elements including at least one of an erosion shield positioned external to the frontal surface, a lightning receptor positioned external to the frontal surface, and means for heating the leading edge positioned in proximity to the frontal surface.

According to a further aspect of the invention, a method is provided for integrated protection for the leading edge of a wind turbine blade against erosion, lightning and icing. The method includes shielding a frontal surface of the leading edge of a wind turbine blade for protecting the leading edge against erosion with at least one of a metallic, metallic modified and a two-piece polymeric layer and metallic layer erosion shield and connecting the erosion shield to a lightning conveyance means within the blade. The method also includes providing heating elements positioned in proximity to the erosion shield and the frontal surface and connecting the heating elements to an energy source within the blade. Steps also include providing a thermal conducting and electrical insulating material between the heating elements and the erosion shield; providing for the conduction of energy of a lightning strike on the erosion shield through the internal lightning conveyance system of the blade to ground; and providing an energy source to the heating elements for preventing icing and deicing the leading edge of the blade.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including providing an integrated protection system for the leading edge of the wind turbine blade against erosion, lightning strikes and icing. The protection system includes an erosion shield with aerodynamic properties, which protects the leading edge against erosion and further serves as a lightning receptor and conveyor, and a heat-generating source for deicing or preventing icing on the leading edge.

Figure 1:
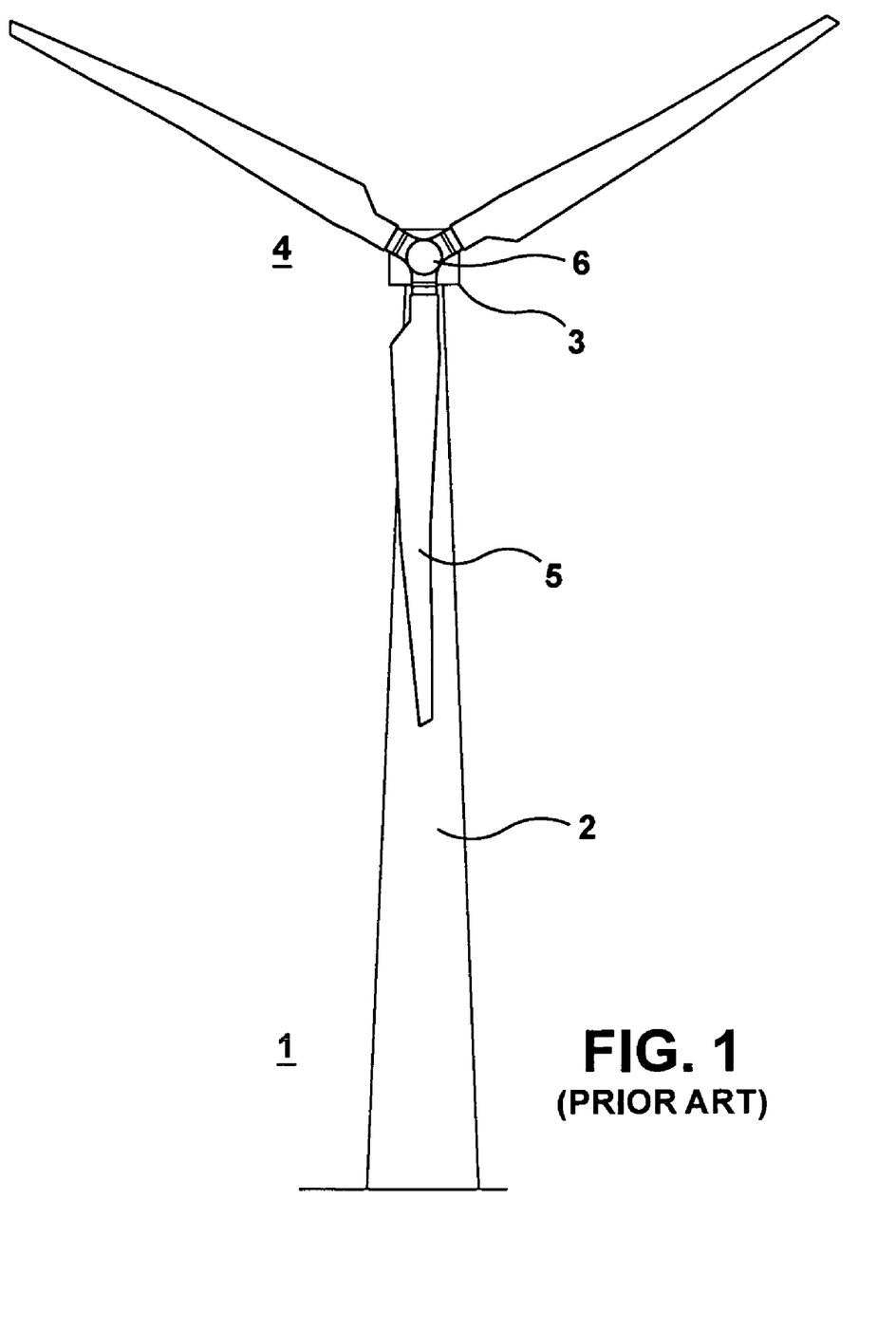
FIG. 1 illustrates a typical structure for a wind turbine.

FIG. 1 illustrates a typical structure for a wind turbine. The wind turbine 1 includes a support tower 2, and a wind turbine nacelle 3 mounted on the support tower 2. The nacelle 3 houses the electrical generator (not shown) and gearbox (not shown) and supports a rotor shaft (not shown) extending from the gear box. The wind turbine rotor 4, mounted on the rotor shaft, supports three wind turbine blades 5 through a hub 6.

Figure 2:
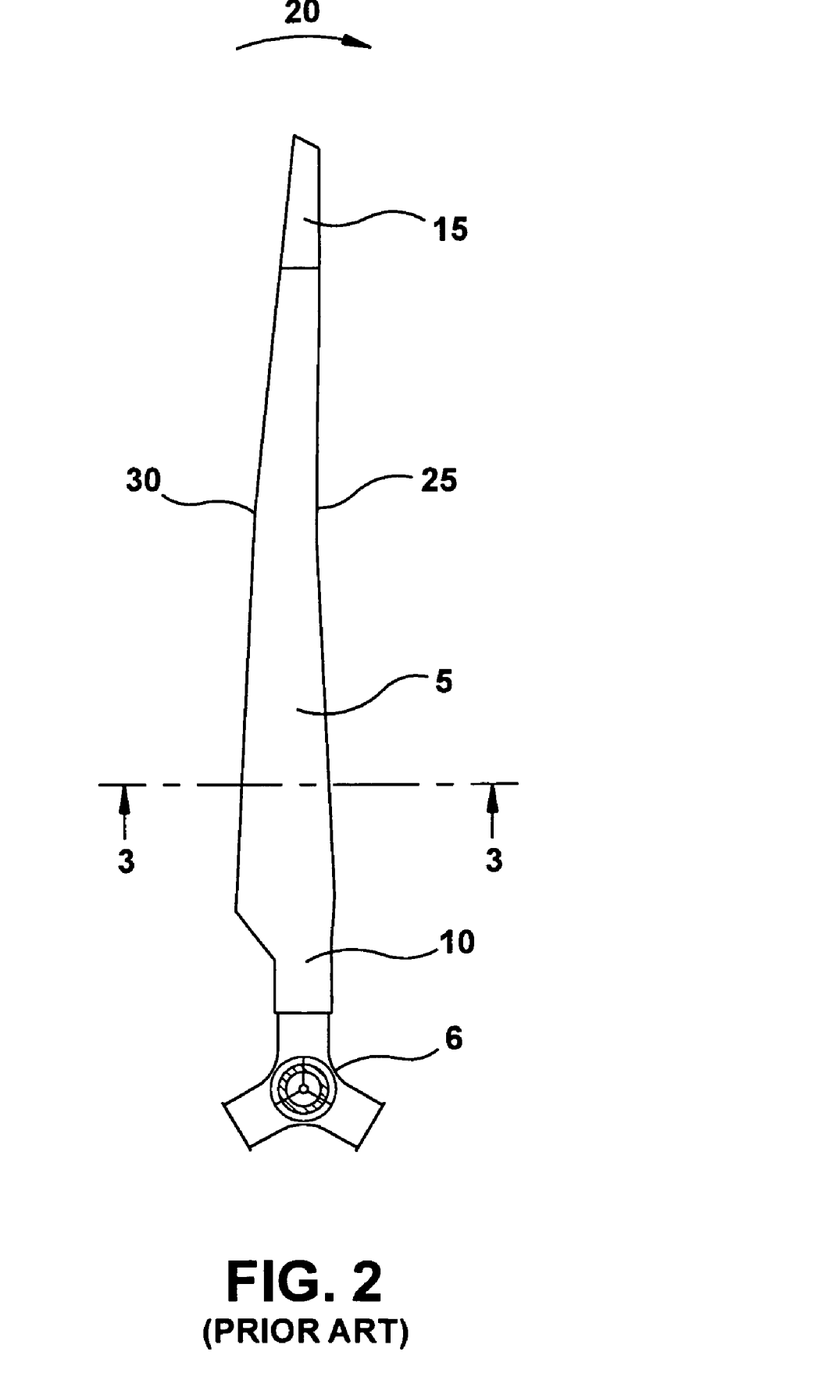
FIG. 2 illustrates a typical structure for a wind turbine blade.

FIG. 2 illustrates a typical structure for a wind turbine blade. The blade root 10 is the section of the blade adjacent to the hub 6. The opposite end of the blade is the tip 15. The direction of rotation of the blade is indicated by the arrow 20. The edge of the blade toward the direction of rotation is the leading edge 25. The edge of the blade opposite to the direction of rotation is the trailing edge 30.

The blade and particularly the leading edge are subject to erosion, lightning strikes and icing. The high velocity and positioning of the leading edge increase the erosive effects of moisture and airborne grit on the edge. The high curvature of the leading edge also promotes icing on the edge. Further, with respect to susceptibility to lightning, the end of the blade closest to the tip, during rotation reaches the highest elevation of any wind turbine component, and consequently has the greatest likelihood of attracting a lightning strike.

Figure 3:
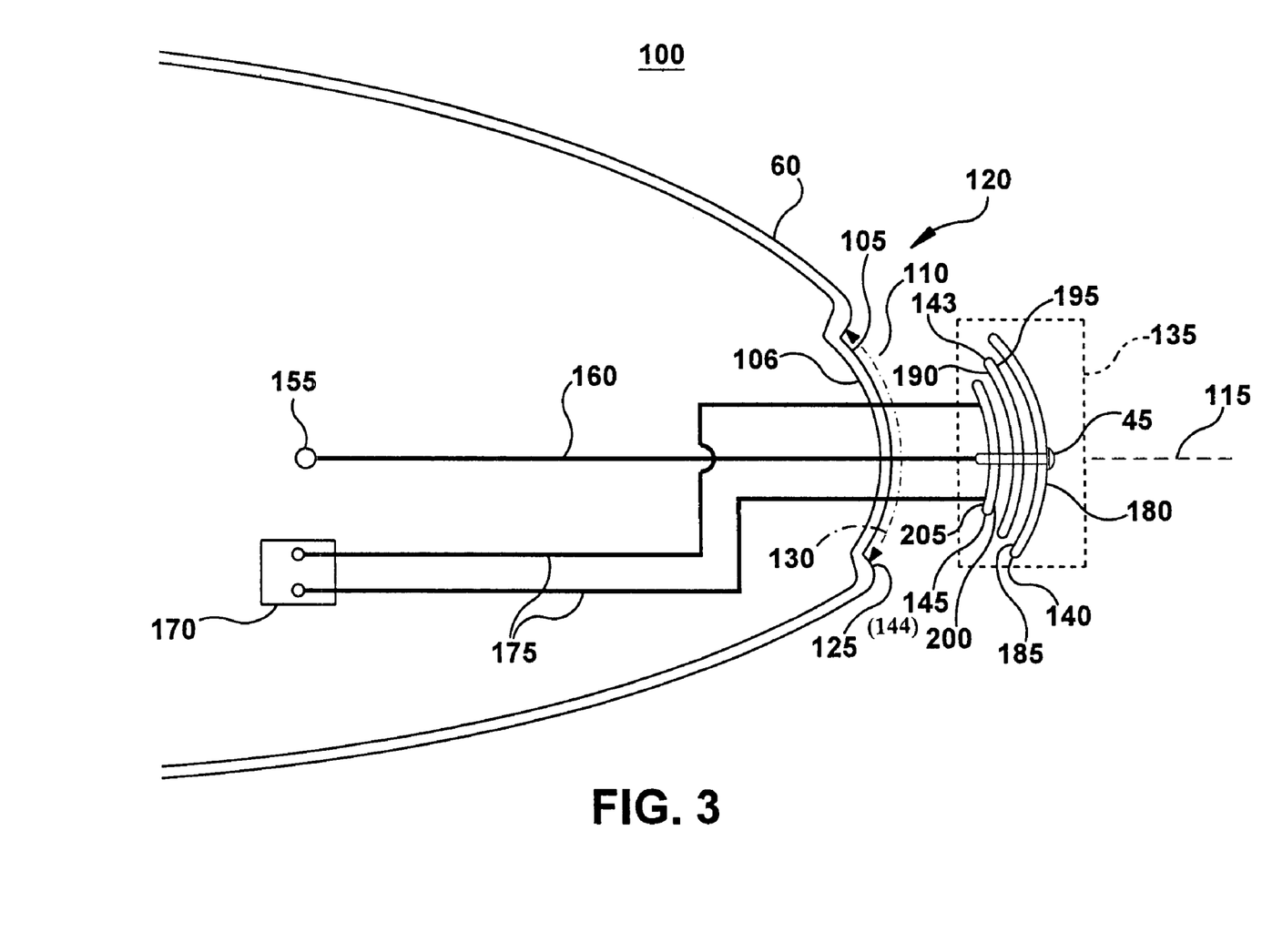
FIG. 3 illustrates a profile of an inventive leading edge of a wind turbine blade where the leading edge provides a recess for mounting external protection elements.

FIG. 3 illustrates a profile of an inventive frontal surface of a leading edge of a wind turbine blade. The frontal surface 105 may include a recess 110, approximately positioned on a centerline 115 of the leading edge 120 of the blade 100. The recess 110 is of sufficient depth 125 and of a sufficient width 130 to accommodate integrated protection elements 135 for the leading edge. The protection elements may include an erosion shield 140 and a heat-generating element 145. The erosion shield 140 is positioned external to the frontal surface 105 of the leading edge 120 of the blade 100. The erosion shield 140 serve a dual role, acting also as a lightning receptor for incident lightning hitting the blade 100.

The blade 100 further includes an internal lightning conveyance path. The internal lightning conveyance path for a wind turbine incorporates means for conducting an electrical current induced by lightning through the blade to ground. When the lightning strikes the blade, the electrical current must be transferred from the blade, through the nacelle, to the tower and into the ground. Within the blade of the wind turbine, many arrangements may be provided to conduct the electrical current from the strike point and through the blade.

Figure 4:
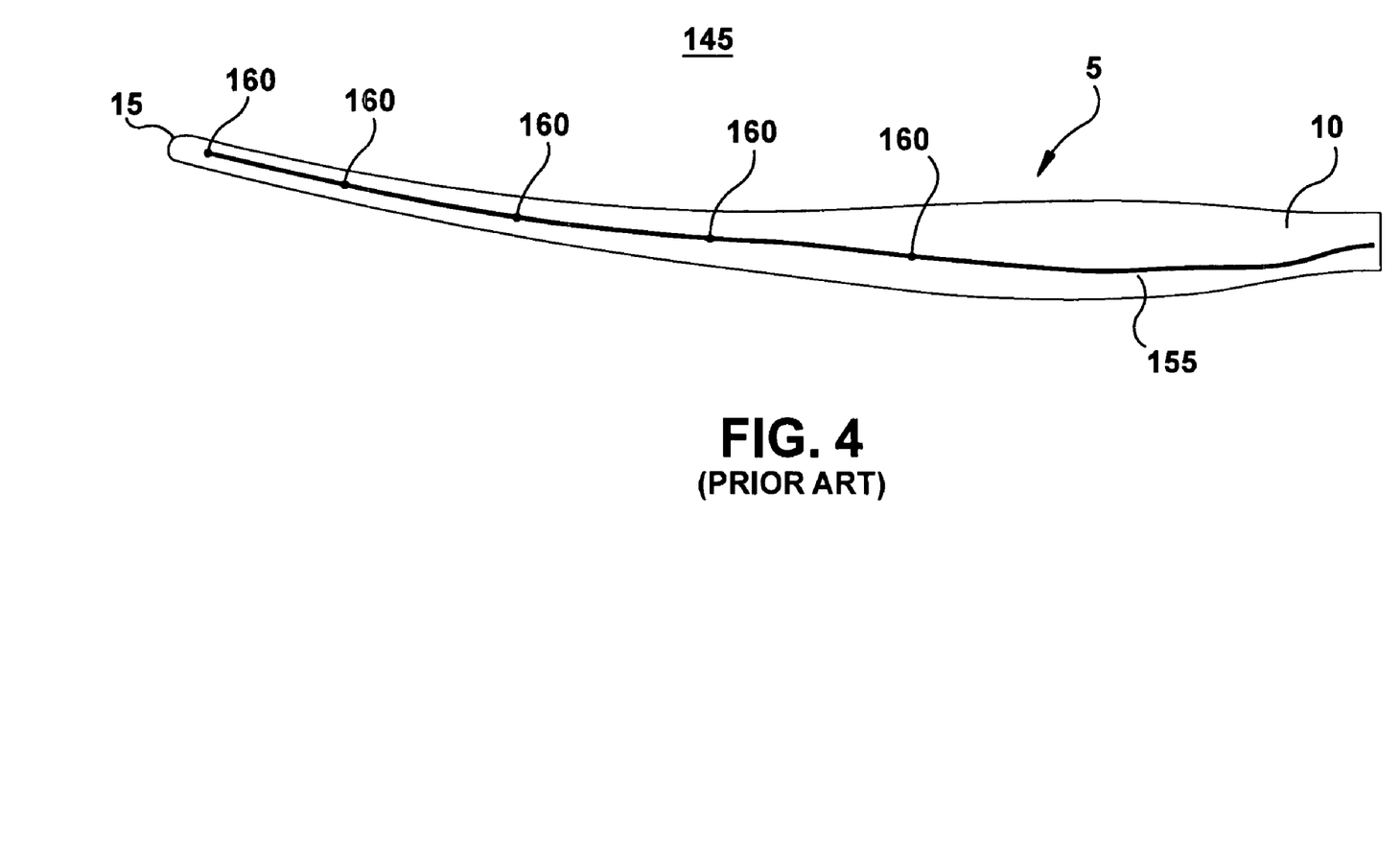
FIG. 4 illustrates an existing internal lightning conveyance path.

FIG. 4 illustrates an existing exemplary internal lightning conveyance path within the blade that may include a central conductor 155, running from approximately the blade tip 15 to the hub, including a plurality of peripheral receptors (not shown) that are connected to the central conductor 155 by peripheral lightning conductors 160. The peripheral receptors are distributed along the span of the blade from the tip 15 inward. The peripheral receptors comprise metallic components configured in various shapes and sizes to attract and conduct the energy associated with a lightning strike in their proximity. The peripheral receptors may be directly connected to the central conductor 155 or may be connected by a suitably sized peripheral conductor.

Figure 7A:
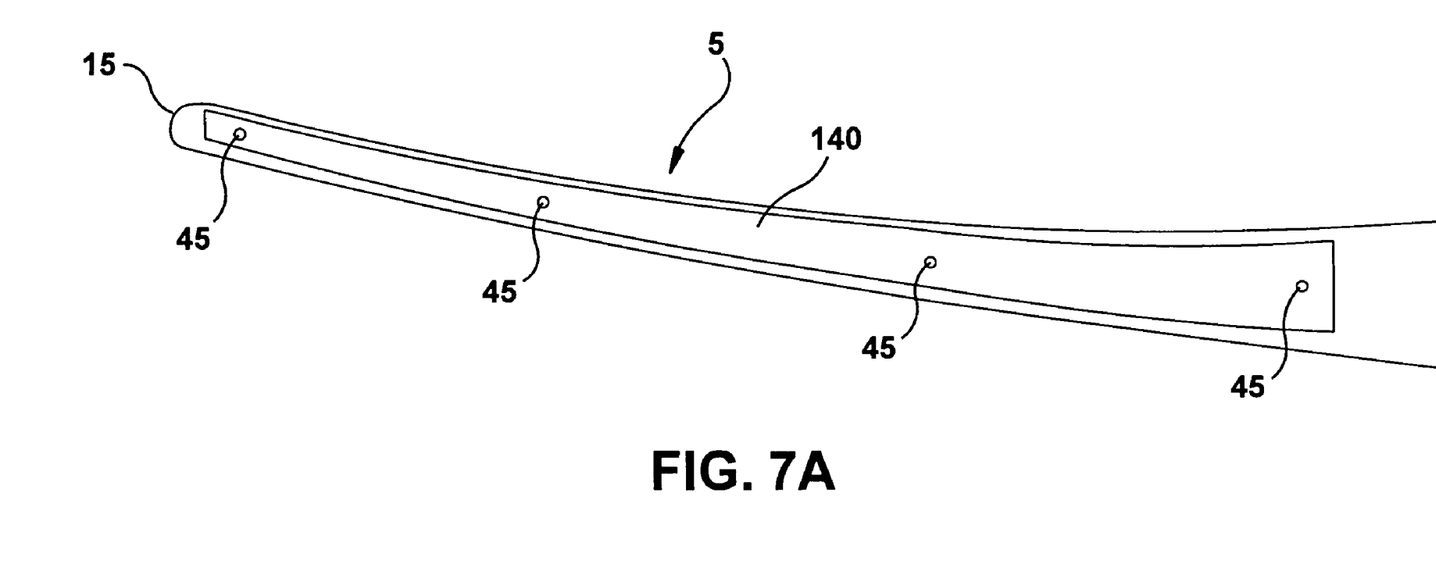
FIG. 7A illustrates a preferable arrangement of an inventive one-piece erosion shield on a frontal view of a blade.

As part of the inventive integrated protection for the leading edge, the erosion shield may act as a distributed peripheral receptor, being connected to the central conductor 155 through the peripheral conductors 160 at a plurality of metallic connection points 45 (FIG. 3). The connection points 45 are laid out at roughly equal spacing along the length of the erosion shield 140 on the blade 100 (FIG. 7A).

Again referring to FIG. 3, the wind turbine blade 100 also may include a path for heat conduction from the heat-generating element 145 to the erosion shield 140 and an electric power source 170 within the blade 100 with a path for conducting heat from the heat-generating element 145 to the erosion shield 140. Further, the electric power source within the blade may be supplied through the hub from the nacelle, tower, or from a land source.

Further with FIG. 3, the heat-generating element 145 for protecting the leading edge from icing may comprise a plurality of resistive strips 144. The plurality of resistive strips 144 may further be electrically isolated from the erosion shield. Further, the plurality of resistive strips 144 may be connected to the electric power source 170 within the blade by electric power leads 175. A layer of material with thermal conducting properties and electrical insulating properties 143 may be positioned between the plurality of resistive strips and the erosion shield. Alternatively, the plurality of resistive strips may be located on the inner surface 106 of the shell 60, behind the frontal surface 105. In this case, the path for conducting heat to the erosion shield 140 would pass through the shell 60.

According to another aspect of the invention, a recess 110 is provided in the frontal surface of the leading edge. The recess 110 is sized to accept the erosion shield 140, the thermally conductive/electrically insulating layer 143 and the plurality of resistive strips 144. The external surface 180 of the erosion shield 140 is shaped to complete the aerodynamic design of the frontal surface 105 of the leading edge 120, when mounted above the plurality of the resistive strips 144 and the thermally conductive/electrically insulating layer 143 onto the recess 110 in the leading edge 120. The internal surface 185 of the erosion shield 140 is conformed to the external surface 195 of the thermally conductive/electrically insulating layer 143. The external surface 195 of the thermal conducting/insulating layer 143 is conformed to the internal surface 185 of the erosion shield 140 and the internal surface 190 of the thermal conducting/insulating layer 143 is conformed to the external surface 200 of the plurality of resistive strips 144. Further the external surface 200 of the plurality of resistive strips 144 are conformed to the internal surface 190 of thermal conductive/electrically insulating layer 143 and the internal surfaces 205 of the plurality of resistive strips 144 are conformed to the recessed frontal surface 105 of the leading edge 120.

Figure 3A:
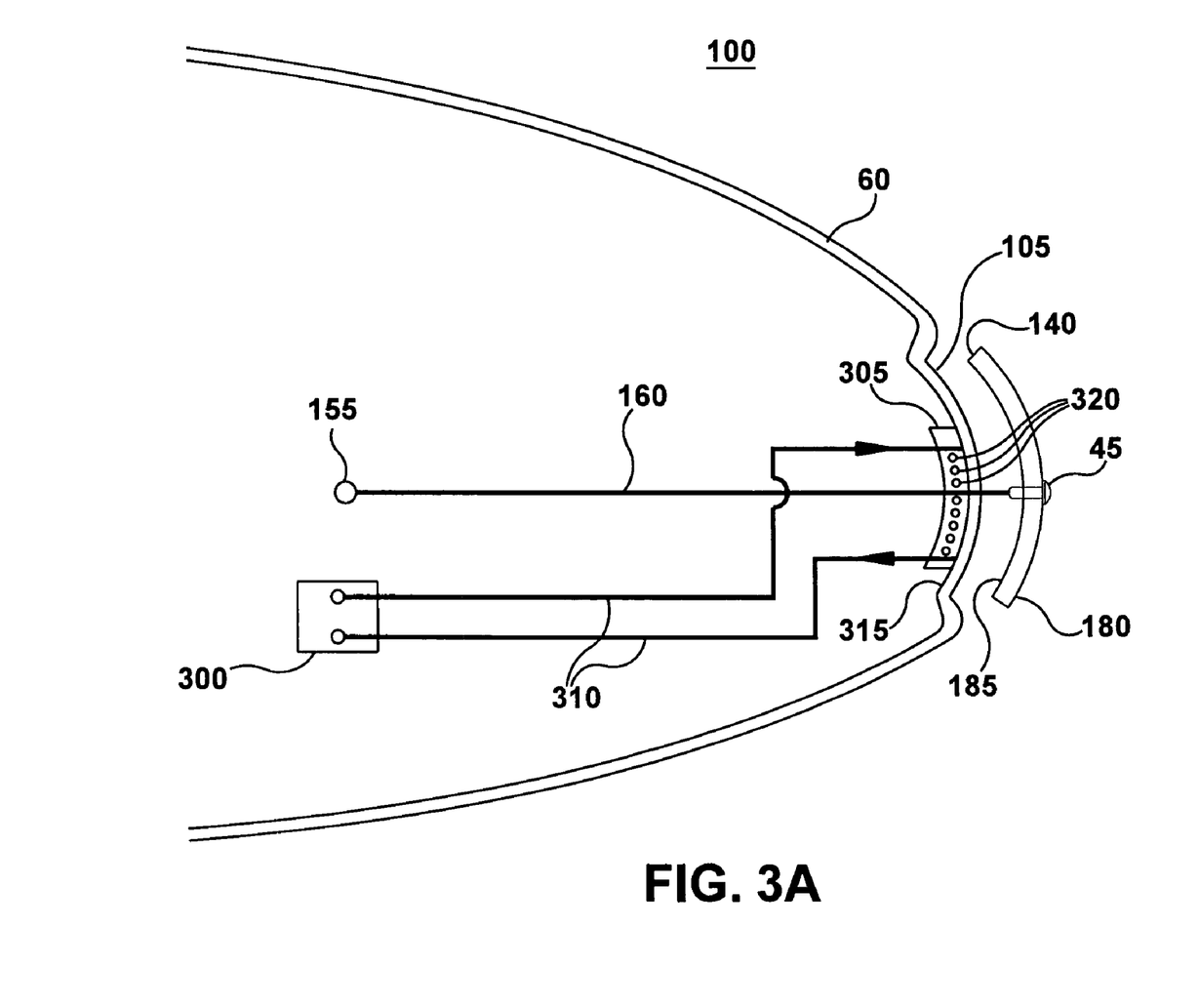
FIG. 3A illustrates an inventive leading edge for a wind turbine blade with a heating element that includes a liquid or gas heat source.

FIG. 3A illustrates an inventive leading edge for a wind turbine blade with a heating element that may include a liquid or gas heat source. The heating element 305 is positioned in proximity to the erosion shield 140 and the frontal surface 105 of the blade 100. The heating element 305 is attached on and shaped to conform to the inner surface 315 of the blade shell 60. The heat source 300 of gas or liquid is provided within the blade 100, however, the heat source may alternatively originate in the nacelle, the hub, or the tower and be connected through the blade 100. The heating gas or liquid is circulated through fluid lines 310 to and from the heating element 305. The heating gas or liquid passes through passages or tubes 320 within the heating element 305, imparting the heat energy to the body of the heating element 305 and transferring the heat energy through the shell 60 of the blade 100 to the erosion shield 140. Here the erosion shield 140 is attached directly to the frontal surface 105 of the shell 60 to promote effective transfer of heat to the erosion shield 140 for deicing. Alternatively, a heat conducting layer (not shown) may be provided between the frontal surface 105 of the shell 60 and the erosion shield 140. The erosion shield 140 may serve a dual role, acting also as a lightning receptor for incident lightning hitting the blade 100.

Figure 6:
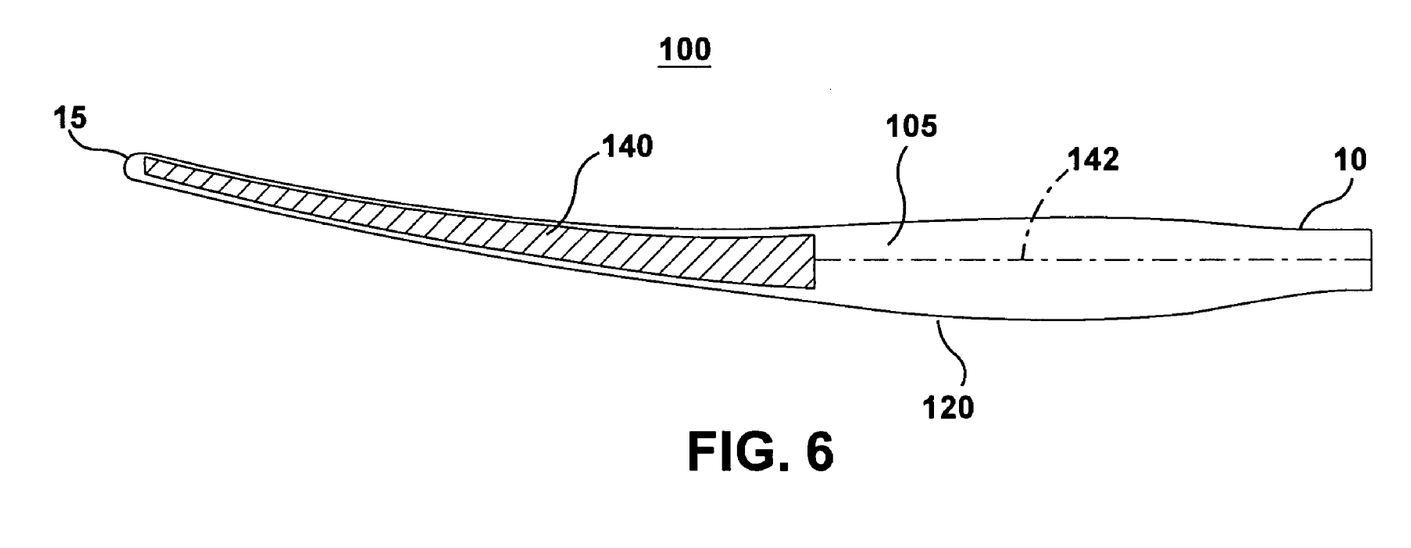
FIG. 6 illustrates a frontal view of an exemplary inventive layout of the erosion shield on the leading edge of a wind turbine blade.

The erosion shield 140 may be one of a metallic strip, a modified metallic strip and a two-piece polymeric layer and metallic layer. Consistent with the surface area of the blade 100 being susceptible to higher risk of erosion, lightning strike and icing, the erosion shield may extend either partially or fully along the frontal surface 105 leading edge 120. FIG. 6 illustrates the erosion shield 140 situated from approximately midpoint on the blade 100 to approximately the tip 15. As illustrated, the erosion shield 140 may also comprise a strip centered on approximately a midline 142 of the frontal surface 105 of the leading edge. Alternatively (not shown), the erosion shield 140 may be skewed with respect to the midline 142 of the frontal surface 105 of the leading edge.

Figure 5:
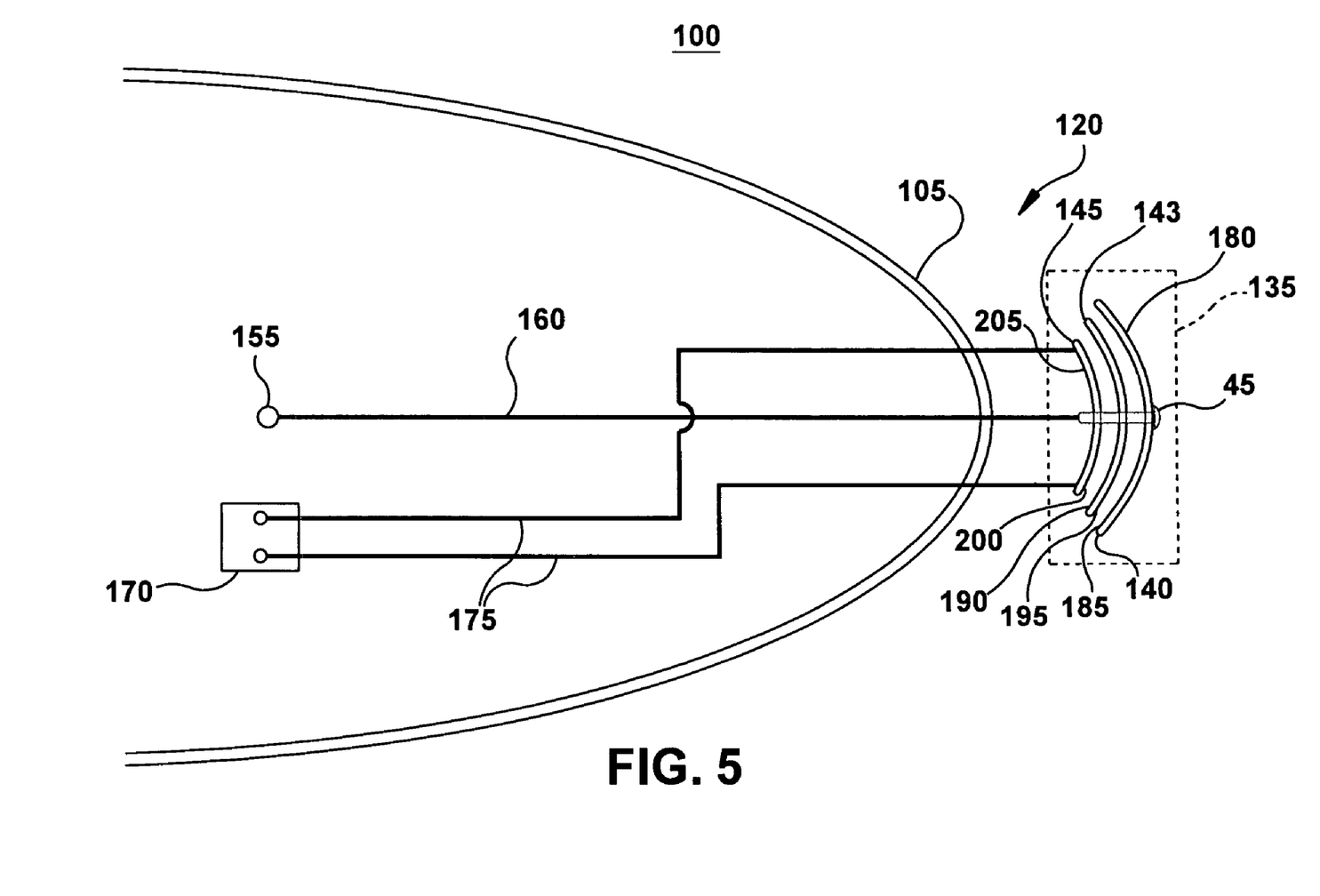
FIG. 5 illustrates inventive integrated protection components for a non-recessed leading edge where mounting of external protection elements completes the shape of the frontal surface of the leading edge.

FIG. 5 shows inventive integrated protection components provided for the non-recessed frontal surface of the leading edge of the blade. The external surface 180 of the erosion shield 140 is shaped to complete the aerodynamic design of the frontal surface of the leading edge, when mounted above the plurality of the resistive strips 144 and the thermally conductive/electrically insulating layer 143 onto the non-recessed frontal surface 105 of the leading edge 120. The internal surface 185 of the erosion shield 140 is conformed to the external surface 195 of the thermally conductive/electrically insulating layer 143. The external surface 195 of the thermal conducting/insulating layer 143 is conformed to the internal surface 185 of the erosion shield 140 and the internal surface 190 of the thermal conducting/insulating layer 143 is conformed to the external surface 200 of the plurality of resistive strips 144. Further the external surface 200 of the plurality of resistive strips 144 are conformed to the internal surface 190 of thermally conductive/electrically insulating layer 143 and the internal surface 205 of the plurality of resistive strips 144 are conformed to the frontal non-recessed surface 105 of the leading edge. As previously described for the recessed frontal surface, the protection components may be attached to the frontal surface by adhesive or mechanical means. Alternatively, the conforming surfaces of the individual parts (the resistive strips, the thermal conducting/electrically insulating layer and the erosion shield) may be sequentially attached to the underlying surface using adhesive or mechanical means. Alternatively, a liquid or gas heat source may be used for deicing including a fluid heating element deployed on the inner surface of a non-recessed frontal surface of the leading edge.

Further, an alternate means of incorporating the integrated protection components may be employed wherein the thermal conductive and insulating material and the heating element are attached to the frontal surface of the leading edge by co-manufacture with a skin of the blade.

Figure 7B:
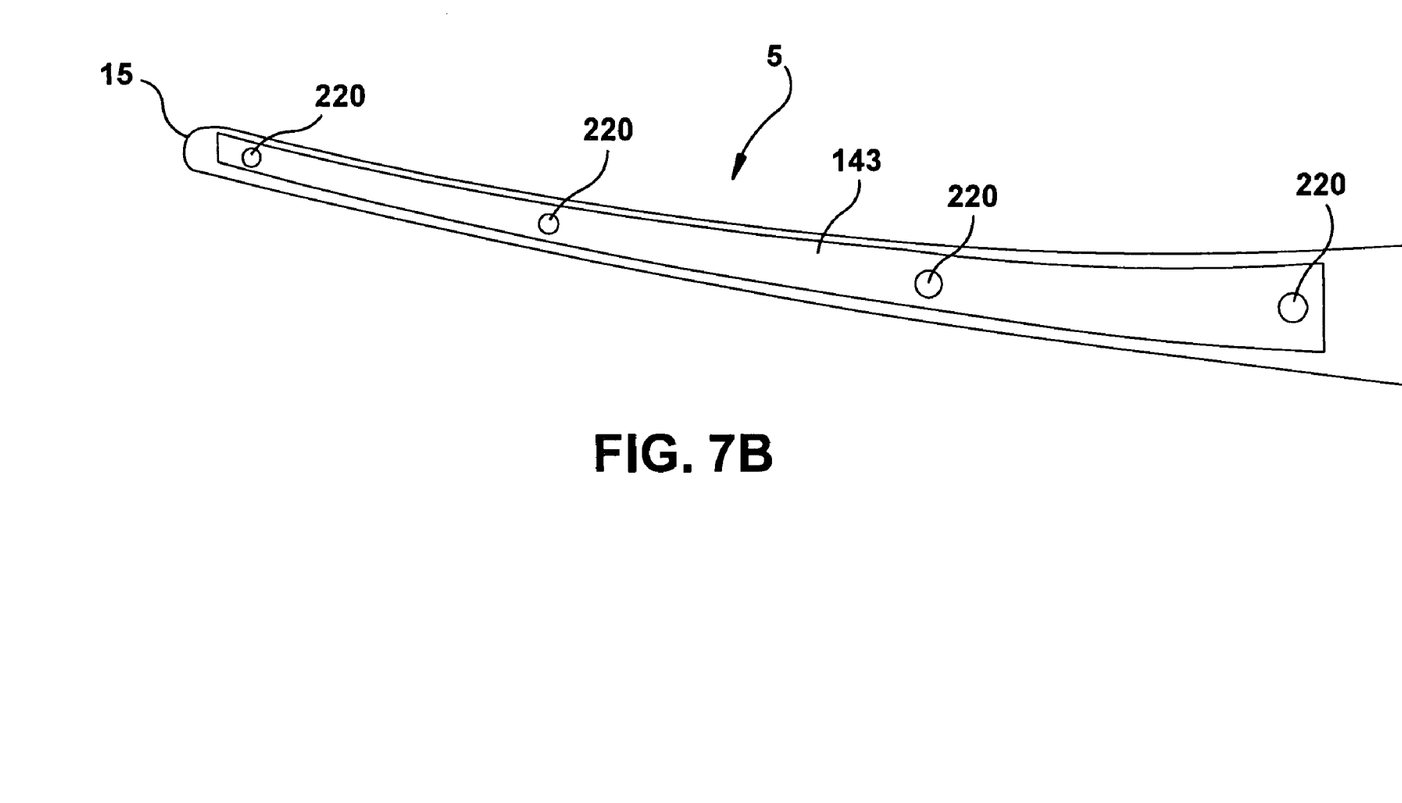
FIG. 7B illustrates a preferable arrangement of an inventive one-piece thermal conducting/electrical insulating layer on a frontal view of a blade.
Figure 7C:
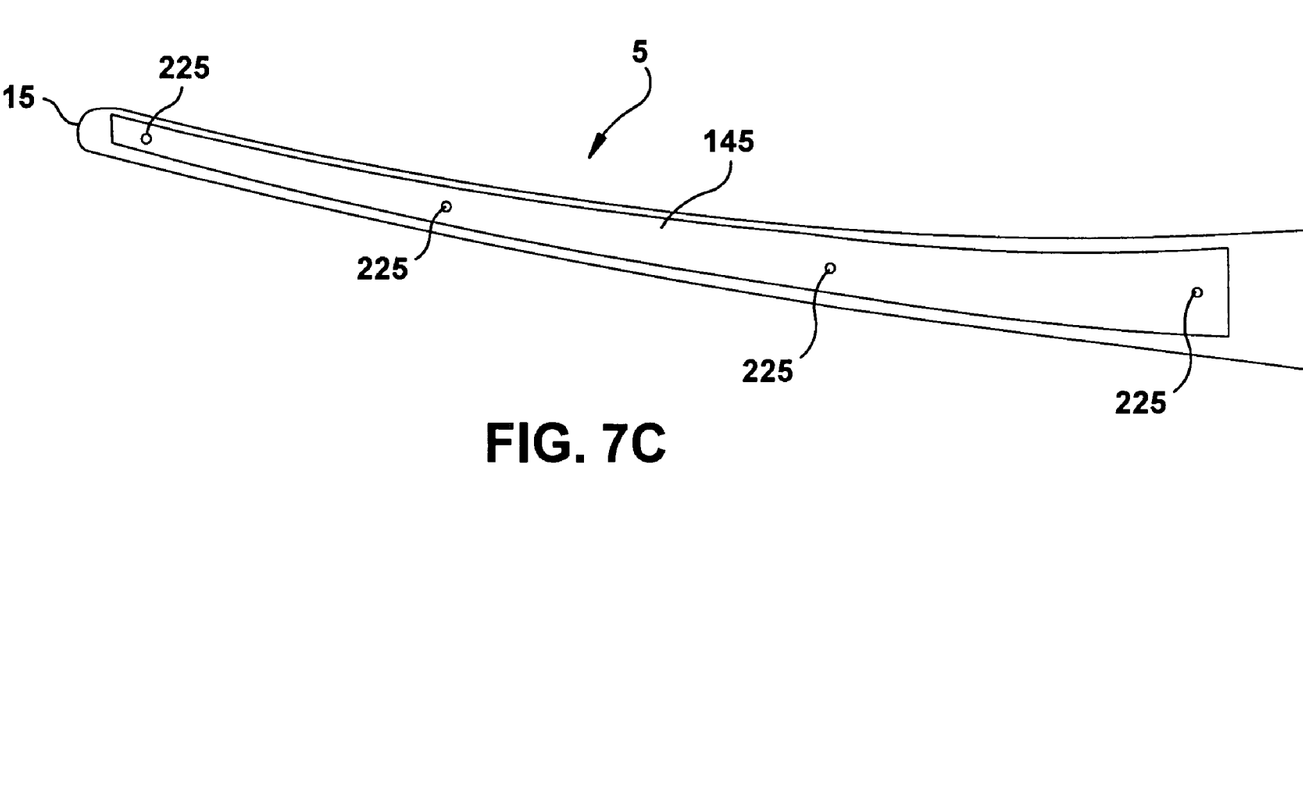
FIG. 7C illustrates a preferable arrangement of an inventive one-piece resistive strip on a frontal view of a blade.

FIG. 6 illustrates an exemplary inventive layout of the mounted erosion shield 140 (above the covered thermal conducting/electrically insulating layer and the resistive strips) in a front view of the leading edge 120. The erosion shield 140 may be positioned centrally with respect to the centerline of the leading edge of the blade. The erosion shield 140 covers the frontal surface 105 from approximately mid-blade to approximately the tip 15. FIGS. 7A, 7B and 7C illustrate an expanded frontal view of the protective elements applied to the leading edge.

FIG. 7A shows the preferable inventive arrangement of a one-piece erosion shield 140 fully covering the opening of a recess (not shown), running lengthwise from approximately midblade to the tip 15 of the blade 5. However, other arrangements of recesses with the erosion shields may be provided, for example, where a plurality of recesses are provided along the length of the blade and a plurality of sections of the erosion shield are provided sized to the recess.

A plurality of exemplary electrical connections 45 are shown connected to the outer surface of erosion shield 140 for connecting the erosion shield 140 with the internal lightning conveyance system within the blade. However, the electrical connections to the erosion shield may be performed by many arrangements known in the electrical arts.

FIG. 7B shows an exemplary inventive arrangement of the thermal conducting and electrically insulating layer 143 within the recess of the frontal surface of the leading edge of the blade 5. The thermal conducting and electrically insulating layer provides for conduction of heat from the heat-generating resistive strips to the erosion shield to prevent icing or to perform deicing. The layer also provides for electrical isolation of the electrical power source on the resistive strips from the lightning conveyance path, such that lightning will not interfere with or damage the resistive strips 144 or the electrical power source. The thermal conducting and electrically insulating layer 143 is preferably provided as a one-piece strip, that includes a plurality of cutouts 220. The cutouts 220 provide a path for the energy of a lightning strike hitting the erosion shield to pass to the internal lightning conveyance system within the blade. However, the thermal conducting/electrically insulating layer 143 may be provided in a plurality of sections, for example, if multiple separate recesses are provided on the frontal surface of the leading edge.

FIG. 7C shows an exemplary inventive arrangement of the heating element (resistive strips in this embodiment) 145 within the recess (not shown) of the leading edge of the blade 5. The resistive strips 145 may be provided as a single strip covering the entire area of the recess. Alternatively, a plurality of resistive strips may be provided, for example if multiple of recesses are provided on the leading edge. Cutouts 225 are provided through the resistive strip and positioned on the strip adjacent to the cutouts 220 located in thermal conducting/electrically insulating layer, above. The cutouts 225 provide a path for the energy of a lightning strike hitting the erosion shield to pass to the internal lightning conveyance system within the blade, without interfering with the resistive strip 144 or the connected ac power source. Although not shown, a plurality of sensors may be applied for sensing the temperature of the leading edge and in conjunction with a wind turbine control system providing control of the electric power provided to the resistive strips.

Figure 8:
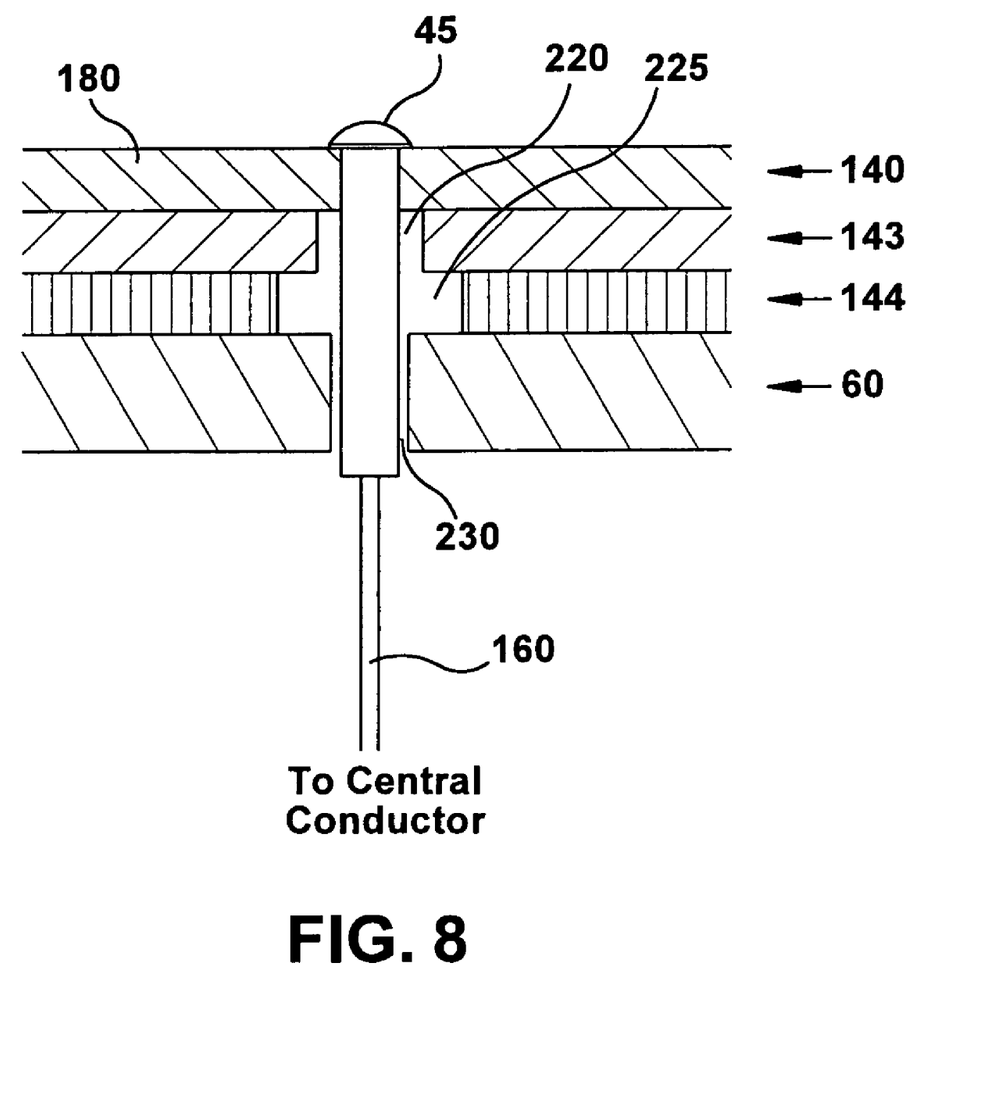
FIG. 8 illustrates an inventive cross section through the leading edge of the blade with penetrations to provide a path for lighting strikes to reach a central conductor.

FIG. 8 illustrates an inventive cross section through the leading edge of the blade at the recess, including the erosion shield 140, the thermal conducting/electrically insulating layer 143, the resistive strip 144, and the shell 60 of the blade. Cutouts 220 in the thermal conducting/electrically insulating layer 143, cutouts 225 in the resistive strip 144, and cutouts 230 in the shell 60 of the blade provide for passage of the lightning current through 160 conductor from the surface 180 of the erosion shield 140 to the central conductor 155 in the blade.

Further, a method is provided for integrated protection of the leading edge of the blade. The method includes providing a metallic or metallic modified erosion shield to a frontal surface of the leading edge of the wind turbine blade to protect the leading edge against erosion. The shield material and thickness provide sufficient wear to sustain erosion for at least the life of the blade. The method provides for connecting the metallic or metallic modified shield erosion shield to a lightning conveyance means within the blade, that will direct the energy of a lightning strike on the shield through the blade, and through the hub, nacelle, tower and into the ground.

The method further includes providing resistive strips and positioning the resistive strips between the erosion shield and the frontal surface of the leading edge. The leading edge may either have a recessed frontal surface as shown in FIG. 3 or a contoured and non-recessed surface as shown in FIG. 5. The resistive strips may be a single strip covering approximately the full area of the frontal surface covered by the erosion shield or may be multiple resistive strips, for example when there is more than one recessed area on the frontal surface of the leading edge or to provide heating to selected areas of the erosion shield-covered leading edge.

The method also includes connecting the resistive strips to an electric power source within the blade and providing a heat conducting and thermal insulating material layer between the resistive strips and the erosion shield to transfer heat to the erosion shield for preventing ice formation/deicing while insulating the resistive strips and the electric power source within the blade from the energy of a lightning strike on the erosion shield. On the occurrence of lightning striking the erosion shield, conducting the energy from the erosion shield through the internal lightning conveyance system of the blade to ground. Further, the method supplies electric power to the resistive strips to prevent icing and to deice the leading edge of the blade.

The method may further include forming the external shape of the shield to complete an aerodynamic design of the frontal surface of the leading edge when mounting the erosion shield on a recessed surface of the leading edge, above the heat conducting and thermal insulating material layer and the resistive strips.

The method may alternatively include forming the external shape of the shield to complete an aerodynamic design of the frontal surface of the leading edge when mounting the erosion shield on a non-recessed surface of the leading edge, above the heat conducting and thermal insulating material layer and the resistive strips.

Additionally mounting the erosion shield above the heat conducting/electrical insulating material and the plurality of resistive strips on the recessed or the non-recessed surface of the leading edge may be performed using at least one of an adhesive and a mechanical attachment.

FIG. 4 illustrates a distributed lightning protection system for capturing and conveying electrical current from a lightning strike. The protection system includes a plurality of peripheral conductors 160 that are connected to a central conductor 155 from peripheral lightning receptors (not shown). The peripheral conductors 160 are distributed along the span of the blade from the tip inward. The peripheral receptors are metallic components configured with various shapes and sizes to attract and conduct the energy associated with a lightning strike in their proximity.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine blade; the wind turbine blade comprising:
   a leading edge with a frontal surface;
   an erosion shield positioned external to the frontal surface;
   a lightning conveyance path;
   an electrical connection from the erosion shield to the lightning conveyance path;
   a heating element positioned in proximity to the erosion shield and the frontal surface;
   a heat conduction path from the heating element to the erosion shield; and
   means for connecting the heating element to an energy source within the blade.

2. The wind turbine blade according to claim 1, the erosion shield comprising one of a metallic strip, a modified metallic strip, and a two-piece polymeric layer and metallic layer.

3. The wind turbine blade according to claim 2, the erosion shield comprising a strip extending at least one of partially and fully along the leading edge of the blade.

4. The wind turbine blade according to claim 3, the erosion shield comprising a strip at least one of centered-on and skewed with respect to a midline of the leading edge.

5. The wind turbine blade according to claim 4, the blade further comprising:
   a recess in the frontal surface of the leading edge, sized to accommodate at least one of the erosion shield, the thermally conductive and electrically insulating material and the heating element;
   an external surface of the erosion shield shaped to form an aerodynamic design of the frontal surface of the leading edge when mounted external to at least one of the heating element and the thermally conductive and electrically insulating material onto the recess in the leading edge.

6. The wind turbine blade according to claim 5, wherein the at least one of the erosion shield, the thermal conductive and electrically insulating material and the heating element are attached to the frontal surface of the leading edge by at least one of an adhesive and a mechanical attachment.

7. The wind turbine blade according to claim 5, wherein the at least one of the erosion shield, the thermal conductive and insulating material and the heating element are attached to the frontal surface of the leading edge by co-manufacture with a skin of the blade.

8. The wind turbine blade according to claim 5, the heating element comprising a plurality of heat-generating resistive strips.

9. The wind turbine blade according to claim 8, wherein the plurality of heat-generating resistive strips are electrically isolated from the erosion shield.

10. The wind turbine blade according to claim 9, the blade further comprising:
    an electrical power source connected through a shell of the blade to the plurality of resistive strips; and
    a thermal conducting and electrically insulating material positioned between the plurality of resistive strips and the erosion shield.

11. The wind turbine blade according to claim 5, the heating element comprising at least one of a hot air element and a hot liquid element.

12. The wind turbine blade according to claim 11, the at least one of the hot air element and the hot liquid element being attached to and shaped to conform to an inner surface of the frontal surface of a shell of the blade.

13. The wind turbine blade according to claim 12, the at least one of the hot air element and the hot liquid element being connected to an energy source within the blade.

14. The wind turbine blade according to claim 4, the blade further comprising:
a frontal surface of the leading edge being non-recessed;
an external surface of the erosion shield shaped to form an aerodynamic design of the frontal surface of the leading edge when mounted external to at least one heating element and the thermal conductive and electrically insulating material onto the frontal surface in the leading edge.

15. The wind turbine blade according to claim 14, wherein at least one of the erosion shield, the thermal conductive and electrically insulating material and the heating element are attached to the frontal surface of the leading edge by at least one of an adhesive and a mechanical attachment.

16. The wind turbine blade according to claim 14, wherein at least one of the erosion shield, the thermal conductive and electrically insulating material and the heating element are attached to the frontal surface of the leading edge by co-manufacture with a skin of the blade.

17. The wind turbine blade according to claim 14, the heating element comprising a plurality of heat-generating resistive strips.

18. The wind turbine blade according to claim 17, wherein the plurality of heat-generating resistive strips are electrically isolated from the erosion shield.

19. The wind turbine blade according to claim 18, the blade further comprising:
an electrical power source connected through a shell of the blade to the plurality of resistive strips; and
the thermal conducting and electrically insulating material positioned between the plurality of resistive strips and the erosion shield.

20. The wind turbine blade according to claim 14, the heating element comprising at least one of a hot air element and a hot liquid element.

21. The wind turbine blade according to claim 20, the at least one of the hot air element and the hot liquid element being attached to and shaped to conform to an inner surface of the frontal surface of a shell of the blade.

22. The wind turbine blade according to claim 21, the at least one of the hot air element and the hot liquid element being connected to an energy source within the blade.

23. An integrated protection system for a leading edge of a wind turbine blade, the protection system comprising:
a wind turbine blade with a leading edge,
the leading edge including a frontal surface;
protective elements including an erosion shield positioned external to the frontal surface, wherein the erosion shield also functions as a lightning receptor, and means for heating the leading edge positioned in proximity to the frontal surface, wherein the means for heating the leading edge comprise a heat conduction path from the heating element to the external surface of the integrated protection system; and the means for connecting the heating element to an energy source within the blade; and further wherein the heating element comprises at least one of heat-generating strips, hot liquid elements and hot gas strips;
a recess in the frontal surface of the leading edge, sized to accommodate at least one of the erosion shield operatively connected to means for lightning conveyance within the wind turbine blade, the thermal conducting and electrical insulating material, and the heating element; and
an external surface of the integrated protection system shaped to form an aerodynamic design of the frontal surface of the leading edge when mounted external to at least one of the erosion shield also functioning as a lightning receptor, the thermal conducting and electrical insulating material, and the heating element onto the recess in the leading edge.

24. A method for providing integrated protection for the leading edge of a wind turbine blade, the method comprising:
shielding a frontal surface of the leading edge of a wind turbine blade for protecting the leading edge against erosion with at least one of a metallic, metallic modified and a two-piece polymeric layer and metallic layer erosion shield;
connecting the erosion shield to a lightning conveyance means within the the blade;
providing heating elements positioned in proximity to the erosion shield and the frontal surface;
connecting the heating elements to an energy source within the blade;
providing a thermal conducting and electrical insulating material between the heating elements and the erosion shield;
providing for the conduction of energy of a lightning strike on the erosion shield through the internal lightning conveyance system of the blade to ground; and
providing an energy source to the heating elements for preventing icing and deicing the leading edge of the blade.

25. The method according to claim 24, the method further comprising:
forming a shape of the erosion shield to complete an aerodynamic shape of the frontal surface of the leading edge when the erosion shield is mounted external to the heating element and thermal conducting and electrical insulating material onto the recessed frontal surface of the leading edge; and
mounting the erosion shield above the heat conducting and electrically insulating material and the heating element onto the recessed frontal surface of the leading edge of a wind turbine blade using at least one of an adhesive and a mechanical attachment.

26. The method according to claim 24, the method further comprising:
forming a shape of the erosion shield to complete an aerodynamic shape of the frontal surface of the leading edge when the erosion shield is mounted external to the heating element and thermal conducting and electrical insulating material onto the non-recessed surface of the leading edge; and
mounting the erosion shield above the heat conducting and electrically insulating material and the heating element onto the non-recessed frontal surface of the leading edge of a wind turbine blade using at least one of an adhesive and a mechanical attachment.

27. The method according to claim 24, the method further comprising:
forming a shape of the frontal surface of the blade to complete an aerodynamic shape of the frontal surface of the leading edge when the erosion shield is mounted external to the heating element and thermal conducting and electrical insulating material by co-manufacture with a skin of the blade.

* * * * *